United States Patent [19]

Kundu et al.

[11] Patent Number: 5,463,744
[45] Date of Patent: Oct. 31, 1995

[54] EMULATION OF SLOWER SPEED PROCESSOR

[75] Inventors: Aniruddha Kundu, Hillsboro; Ali S. Oztaskin, Beaverton, both of Oreg.

[73] Assignee: Intel Corporation, Santa Clara, Calif.

[21] Appl. No.: 205,352

[22] Filed: Mar. 2, 1994

Related U.S. Application Data

[63] Continuation of Ser. No. 815,811, Dec. 30, 1991, abandoned.

[51] Int. Cl.$^6$ ........................................ G06F 1/14
[52] U.S. Cl. .................. 395/375; 395/550; 364/946.2; 364/950; 364/271.9
[58] Field of Search ................................. 395/375, 550, 395/775, 800

[56] References Cited

U.S. PATENT DOCUMENTS

| | | | |
|---|---|---|---|
| 4,451,897 | 5/1984 | Murao | 364/DIG. II |
| 4,502,117 | 2/1985 | Kihara | 395/425 |
| 5,175,844 | 12/1992 | Fukuda | 395/550 |

OTHER PUBLICATIONS

Intel Corporation, *Microprocessor and Peripheral Handbook*, vol. 1 Microprocessor (1988), pp. 2-1, 2-5, 2-25, 2-89, 2-92, 2-145, 2-151, 2-154, 2-163, 2-177, 3-1, 3-4, 4-1, 4-59, 4-84 to 4-86, and 4-91.

*Primary Examiner*—David Y. Eng
*Attorney, Agent, or Firm*—Blakely, Sokoloff, Taylor & Zafman

[57] ABSTRACT

A pulse width modulation circuit in a computer system for emulating a processor operating at a slower instruction execution speed. The pulse width modulator a computer system clock, and a register containing a first value. The first value is user-definable by software and specifies a proportion of time that a processor should remain idle. The apparatus further comprises a counter coupled to the clock, the counter having a range between a second and third values which includes the first value. A comparator is coupled to the counter and the register, and the comparator causes a central processing unit to suspend instruction execution for a specified interval of time. The comparator causes the central processing unit to resume instruction execution for remainder of the counter's range. The processor is therefore kept idle for proportions of time depending on the values of the register and the counter to emulate a slower speed processor. For high performance processors which have an on processor cache, the cache is flushed and disabled.

13 Claims, 2 Drawing Sheets

EMULATION OF SLOWER SPEED PROCESSOR

This is a continuation of application Ser. No. 07/815,011, filed Dec. 30, 1991 now abandoned.

BACKGROUND OF THE INVENTION

1. Field of the Invention

The present invention relates to processors. More specifically, this invention relates to controlling the instruction execution speed of a processor to ensure backward compatibility with existing software.

2. Background Information

As processors gain more capability, such as the ability to execute at higher speeds, and/or the ability to accept more bits of information than prior processors, compatibility with existing software is called into question. For instance, certain software may require that the system operate at a certain rate so that results and/or other information may be available in a predetermined period of time. For instance, some computer games require that a processor operate at a certain rate.

Although the current trend is to increase the performance, and thus, the throughput of most computer systems, there are some situations in which a user may desire to run the system at a lower instruction execution rate to ensure software compatibility. Prior art systems typically use adjustable clock rates on microprocessors to vary the speed between one rate and another. Therefore, in one example, if a processor is currently running at 33 MHz, the user may slow down the processor to a clock speed of 20 MHz. However, such systems typically require multiple clock crystals and/or other circuitry to allow this to occur. In addition, the range of clock speeds available in such systems typically is limited to two or three speeds in the system. If the user wishes to slow the processor and thus overall execution speed of the computer system even further, he may be required to install a different clock crystal. Thus, the predominant prior art method for slowing the execution speed of a processor and thus a computer system is to make extensive hardware modifications to a system. Alternatively, systems having multiple clock operating frequencies typically are limited to one or two clock speeds, and require additional circuitry to facilitate the operation at the various clock frequencies. Thus, the prior art provides no means for operating at a variety of instruction execution rates for providing the maximum software compatibility for the full range of software products and the full range of computer systems using a variety of microprocessors.

SUMMARY AND OBJECTS OF THE INVENTION

One of the objects of the invention is to provide a means for slowing the instruction execution rate of a microprocessor for providing maximum software compatibility.

Another of the objects of the present invention is to provide a full range of instruction execution speeds in computer systems without the need for additional crystals or other complex circuitry.

These and other objects of the present invention are provided for by a pulse width modulation circuit in a computer system for emulating a processor operating at a slower instruction execution speed. The pulse width modulator comprises a computer system clock, and a register containing a first value. The first value is user-definable by software and specifies a proportion of time that a processor should remain idle. Therefore, slower speed processors may be emulated. The circuit itself is also activatable by the user during a reset of the computer system in one embodiment. The apparatus further comprises a counter coupled to the clock, the counter having a range between a second and third values which includes the first value. The counter increments upon each pulse of the clock so that the time that the processor is idle may be monitored. A comparator is coupled to the counter and the register, the comparator activates a signal to a first state if the counter contains less than or equal to the value contained in the register. The first state of the signal causes a central processing unit to suspend instruction execution. The comparator activates the signal to a second state if the counter contains greater than the value in the register. The second state causes the central processing unit to resume instruction execution. In another embodiment, the signal may be activated to the first state if the counter is greater than or equal to the value contained in the register, and the second state if the counter contains less than the value in the register. A processor is therefore kept idle for proportions of time depending on the values of the register and the counter to emulate a slower speed processor. For high performance processors which have an on processor cache, the cache is flushed and disabled.

BRIEF DESCRIPTION OF DRAWINGS

The present invention is illustrated by way of example and not limitation in the figures of the accompanying in which like references indicate like elements and in which.

DETAILED DESCRIPTION

An apparatus for emulating slower speed processors in a high performance computer system is described. In the following description, for the purposes of explanation, numerous specific details are set forth such as circuitry, signal names, gates, etc., in order to provide a thorough understanding of the present invention. It would be obvious, however, to one skilled in the art that the invention may be 5practiced without these specific details. In other instances, well-known circuits, signals, and processors have not been shown in detail in order to not unnecessarily obscure the present invention.

The present invention provides a means for emulating slower speed processors by using a pulse width modulation circuit to generate a "hold" or CPU suspend signal for a predetermined duration in order to simulate the slower instruction execution rate of certain lower performance processors. In some modern microprocessors, such as the 80486 microprocessor available from Intel Corporation of Santa Clara, California, a signal may be applied to the microprocessor to indicate that it should suspend instruction execution. This signal is known as the bus hold request input signal (HOLD) which is described in the publication *Microprocessors,* Volume 2 (1991) (hereinafter "Microprocessors") at pages 5-84 and 5-85. The bus hold request input signal on the 80486 microprocessor allows another bus master to retain complete control of the microprocessor bus. A second signal, the bus hold acknowledge (HLDA), is asserted by the processor when the processor receives the hold request and places its input and output pins into a high impedance state (floated) after completing its current bus cycle, burst cycle, or sequence of locked cycles. The processor stays in this state until the HOLD signal is deasserted. The HLDA signal indicates that the microprocessor has given the bus to another local bus master. HLDA is driven active in the same clock cycle that the processor floats its bus. The signal is driven inactive when the HOLD signal is deasserted and the processor regains control of the bus. This signal remains asserted during a bus hold.

Figure 1:
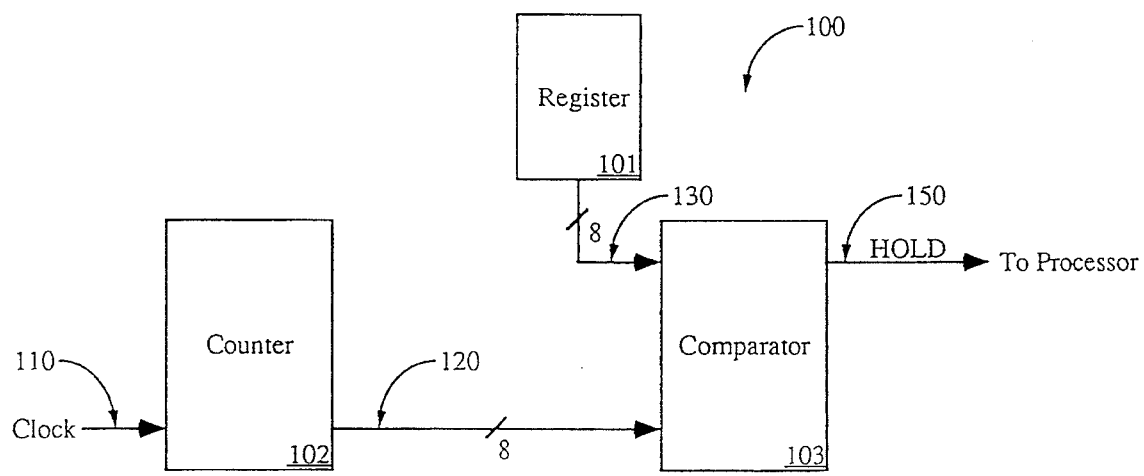
FIG. 1 shows the structure of one embodiment of the present invention.

The preferred embodiment is a software programmable hardware pulse width modulation circuit which suspends execution of the processor in a computer system for a period of time to simulate the lower instruction execution rate of earlier generation processors. One embodiment of this invention is shown in FIG. 1. 100 in FIG. 1 shows a basic structure of the pulse width modulation circuit 100 provided by one embodiment of the present invention. When active, circuitry 100 comprises a register 101 which will contain a 8-bit value which indicates the period of time in which the processor is to have its instruction execution suspended. This register is loadable by software and additional circuitry may be present in a computer system to allow the user to modify register 101. An 8-bit counter 102 which is driven by a clock line 110 continuously cycles from 0 to 255, whereupon it is reset to 0 upon overflow. The output of counter 102 is input over lines 120 into comparator 103. Comparator 103 compares the 8-bit value received from register 101 and the 8-bit value received from counter 102. Comparator 103 compares the value contained within register 101 driven over lines 130 with that received over lines 120. As long as the value received from counter 102 over lines 120 is less than or equal to the value contained within register 101, comparator 103 asserts a "hold" (HOLD on the 80486 microprocessor) signal over line 150 to the processor in the system. As long as the HOLD signal is asserted over line 150, the processor is in an instruction execution suspend state wherein the address and data lines on the processor are floated, and no further instructions are executed. As described above, any currently executing instructions are completed, and the processor halts execution on the next instruction to be fetched. In this embodiment, the cache lines are flushed at the time of the enablement of the slow speed emulation mode and the cache is disabled. As long as counter 102 is less than or equal to the value contained within register 101, the HOLD signal is asserted over line 150 by comparator 103. Once the contents of the counter 102 exceeds the value contained within register 101, the HOLD signal is deasserted over line 150, and the processor resumes execution until counter 102 overflows. At that time, the counter is reset and the HOLD signal is again reasserted over line 150. This continues as long as circuitry 100 is enabled.

Figure 2:
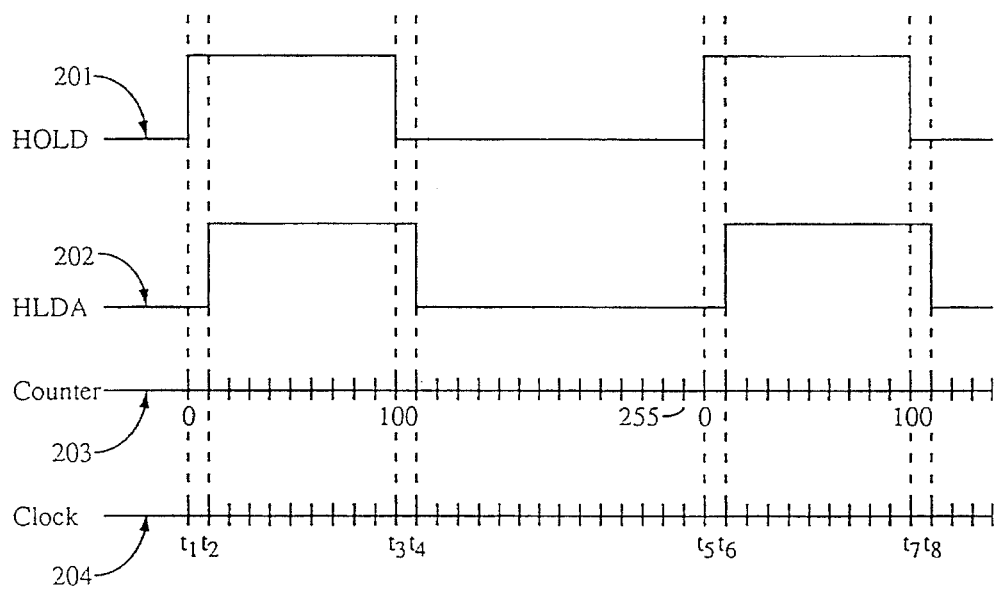
FIG. 2 shows a timing diagram illustrating when a processor actually halts instruction execution after the receipt of a "hold" signal.

A timing diagram illustrating the HOLD signal and processor execution is shown in FIG. 2. As is shown in FIG. 2, once HOLD signal 201 is asserted at time $t_1$, when counter 203 contains 0, at a time such as $t_1$ shown in FIG. 2, hold signal 201 will be asserted. Once hold signal 201 is asserted at time $t_1$, shortly thereafter, at time $t_2$, CPU execution is suspended. This is indicated by 202, the hold acknowledge signal (HLDA) 202. The time between $t_1$ and $t_2$ may vary depending on the current operating status of the processor. As discussed above, this is dependent upon whether the processor was in a "burst" mode, in the process of executing an instruction, or similar state. As indicated by 202, CPU execution is suspended for as long as HOLD signal 201 is asserted. For instance, in the example shown in FIG. 2, HOLD signal 201 is asserted for 100 clock cycles as indicated by counter 203. Then, at time 13, HOLD signal 201 is deasserted. At time $t_4$, the CPU resumes execution, and will continue to execute instructions from time $t_4$ to 16. When the next HOLD signal is asserted at time $t_5$, HLDA signal 202 is asserted and the processor actually suspends operation. Again, as discussed with reference to the earlier HOLD issued at time $t_1$, another HOLD may be issued at time $t_5$, and the processor suspends execution at time 16. HOLD signal 201 is asserted until time 17, and processor execution resumes at time 18- A more detailed view of the circuitry used in the preferred embodiment to emulate slower speed processors is shown with reference to FIG. 3.

Figure 3:
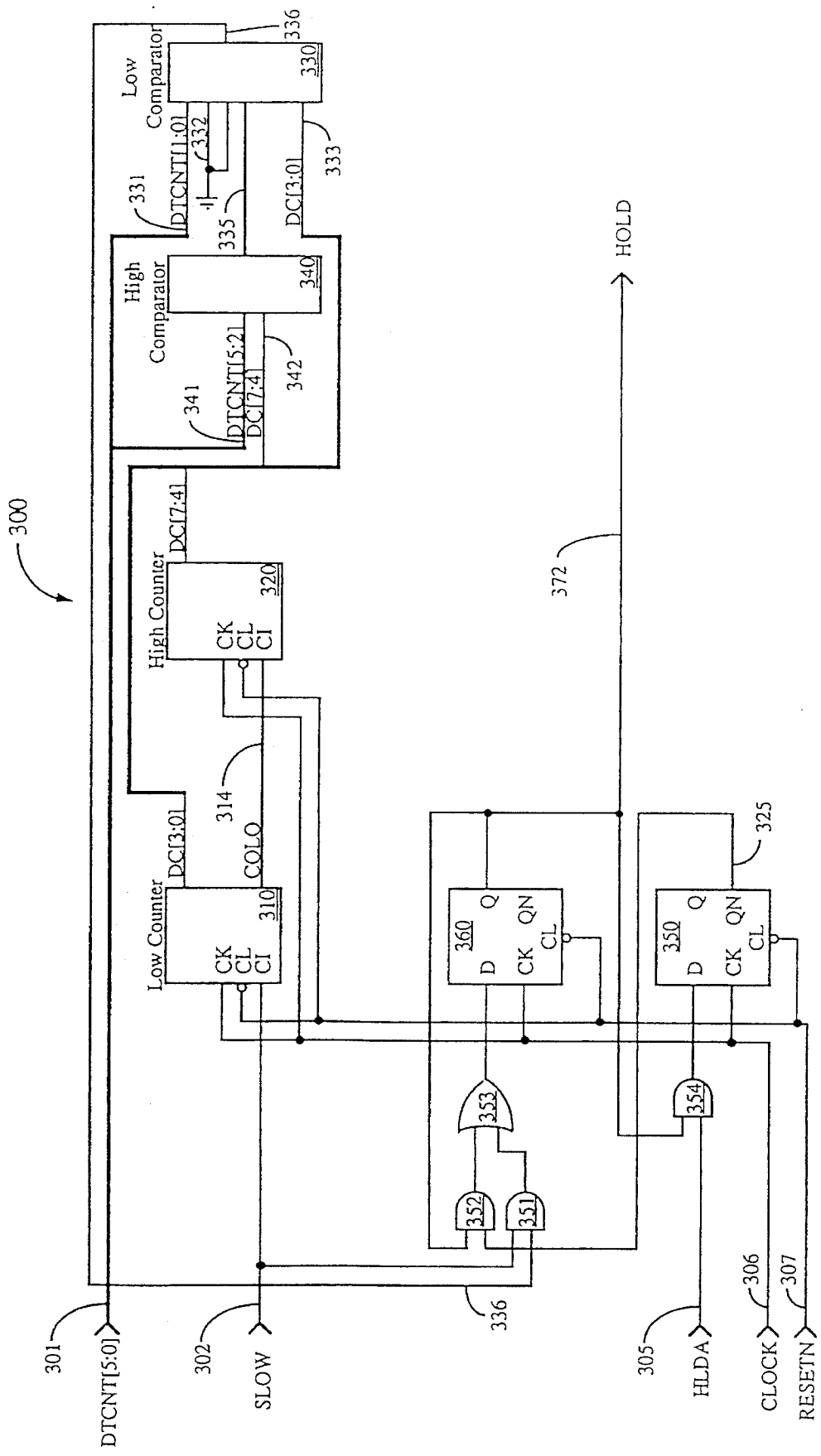
FIG. 3 shows a detailed diagram of the circuitry provided by the preferred embodiment.

Apparatus 300 in FIG. 3 comprises two counters 3 10 and 320 cascaded for counting the four least significant bits and the four most significant bits respectively, in order to form an eight bit counter. Then, using the values returned out of counters 3 10 and 320, the values from the low counter 310 are input to a low four bit comparator 330, and the value returned out of the high counter 320 are input to a high four bit comparator 340. The six bits from the register to determine the pulse modulation width is input over lines 301, and the four most significant bits are input into high comparator 340 on line 341. The two least significant bits from the word are input into the low comparator 330 on lines 331. The two remaining bits to compare the counter value in comparator 330 are tied to ground via lines 332. Therefore, the high comparator checks the four high most significant bits input over lines 342 into comparator 340 against the register's four most significant bits input over line 341. In addition, the four least significant bits of the count received from counter 310 over lines 333 are compared against the two least significant bits of the counter register received over lines 331, and the two grounded lines 332 input into comparator 330. Therefore, granularities of down to four clock cycles of comparison is provided by apparatus 300 shown in FIG. 3.

Low counter 310 is activated by the SLOW signal driven over line 302 indicating that the emulated slower instruction execution mode should be entered. This may be a software controllable line coupled to a register. For instance, in one embodiment, line 302 may be activated by depressing a particular keyboard sequence dynamically at run time, causing the activation of line 302 and thus circuitry 300. When this occurs, the processor cache is flushed and the on-processor cache is disabled. For instance, for the 80486 microprocessor, when entering this mode, the signal KEN# is deasserted, and the signal FLUSH# is asserted. This flushes and disables the on-processor cache (see, *Microprocessors* at pp. 5-85 and 5-86). The SLOW signal is input over line 302 to activate counter 310. On each clock pulse received over line 306, counter 310 is incremented by one. This occurs until counter 310 reaches its maximum value of $t_5$. The counter carry output signal is output from counter 310 over line 314 which to activates high counter 320. Counter 320, like counter 310, is clocked over line 306. Therefore, on each maximum value of low counter 310, high counter 320 is activated by line 314 as driven by counter 310, and 320 increments on a clock pulse as received over line 306

High comparator 340 is tied to low comparator 330 via lines 335. Lines 335 contain an active signal when the counter value received over line 342 is less than or equal to the value received from the register over lines 341. If this is the case, then the low comparator is activated to perform a comparison to determine if the value received from the low counter 310 over lines 333 is less than or equal to the two bits received over lines 331, in conjunction with the grounded lines 332. If so, then a signal is asserted over line 336 to generate the processor HOLD signal.

The hold request signal over line 336 is further qualified by the slow speed emulation mode indicator SLOW signal received over line 302 and applied to AND gate 351. The output of AND 351 is fed to one of the inputs of OR gate 353. The other input of the OR 353 is used to ensure the HOLD signal on line 372 remains asserted until the hold request over line 336 is acknowledge by the processor as indicated by the HLDA signal received over line 305. The output of OR 353 is connected to the data input of the flipflop 360. Hence, when the circuitry is in the slow speed emulation mode and the counter value is less than the register value, the output of the AND 351 is asserted, the output of OR 353 is asserted, and finally upon a low to high transition of the CK input of flipflop 360, the Q output of the flipflop 360 goes high indicating a hold request to the processor over line 372 (the HOLD output signal).

The HOLD signal is fed to one of the inputs of AND gate 352 over line 372. The other input of AND 352 is connected to the QN output of the flipflop 350, which remains high until the processor acknowledges the hold request by asserting HLDA over line 305. Hence, AND 352 ensures that the HOLD signal remains active until the processor acknowledges the hold request by asserting HLDA signal even if the hold request over line 336 goes inactive or the SLOW signal is deasserted over the 302 under software control.

Upon receipt of the HOLD signal over line 372, the processor completes the current bus operation and acknowledges the hold request by asserting the HLDA signal. This signal is fed to AND gate 354 over line 305. The other input of AND 354 is the HOLD signal generated by this circuitry. Hence, when the HOLD is generated by this circuitry over line 372, and the processor acknowledges the hold request by asserting the HLDA signal over line 305, the data (D) input of flipflop 350 is asserted. And finally, upon a low to high transition of the CK input (connected to CLOCK over line 306) of flipflop 350 the QN output is deasserted, as is the output of AND 352. Once tho HLDA signal is received, this circuitry will continue to assert the HOLD signal Over line 372 until the counter value is equal or greater than he register value received over line 301 or the slow processor speed emulation mode is exited by deasserting the SLOW signal over line 302 under software control.

In this manner, and as discussed with reference to the timing diagram set forth in FIG. 2 above, the hold signal may be asserted from the time that the counters overflow to 0, and when they reach a value specified by the register coupled to line 301. Once this value is reached, the hold signal over line 372 is deasserted, and the processor resumes execution. Thus, the processor executes instructions only for a proportion of its full speed. Therefore, instruction execution speed as a proportion of the full rate of the processor (as determined by the value in register 101 or the register coupled to lines 301) may emulated by the circuitry contained in a circuit such as 3 shown in FIG. 3 or 100 in FIG. 1. In another embodiment, the HOLD may be asserted for the period when the value contained in a counter such as 102 reaches the value contained within the register. It can be appreciated by one skilled in the art that any number of apparatuses may be used to cause the processor to only operate a proportion of the time it would normally operate in.

Thus, a circuit for emulating a slower speed processor is provided by the pulse width modulation circuitry set forth in the figures and discussion as disclosed above. Although the present invention has been descried specifically with reference to FIGS. 1 through 3, it can be appreciated by one skilled in the art that this invention has application far exceeding that disclosed in the figures. It would obvious to one skilled in the art that many departures and modifications may be made from the embodiment as disclosed herein.

What is claimed is:

1. A pulse width modulation circuit for slowing the instruction execution rate of a processor in a computer system, the pulse width modulation circuit comprising:

a. a counter coupled to a system clock, the counter having a range between a first and second values, the counter incrementing upon a pulse of the clock;

b. a register containing a third value, the third value being between the first and second values;

c. a comparator coupled to the counter and the register, the comparator asserting a first signal when the counter contains a value having a predetermined relationship to the value in the register;

d. first circuitry coupled to said comparator and a central processing unit, said first circuitry asserting a hold signal to said central processing unit upon assertion of said first signal from said comparator;

e. second circuitry coupled to said first circuitry and said central processing unit, wherein said second circuitry deasserts a second signal to said first circuitry in response to a processor suspend acknowledge signal received from said central processing unit and said hold signal received from said first circuitry; and f. said first circuitry maintaining said hold signal until said comparator deasserts said first signal and said second circuitry deasserts said second signal.

2. The pulse width modulation circuit of claim 1 wherein the first value is 0 and the second value is 255.

3. The pulse width modulation circuit of claim 1 wherein the third value is user definable through software.

4. The pulse width modulation circuit of claim 1 wherein said first circuitry is coupled to a third signal, said first circuitry operative upon the activation of said third signal to a first state by a user of said computer system.

5. The pulse width modulation circuit of claim 4 wherein said first state of said third signal further causes said central processing unit to flush and disable an internal cache.

6. The pulse width modulation circuit of claim 1 wherein said predetermined relationship comprises said counter containing a value greater than the value in the register.

7. The pulse width modulation circuit of claim 1 wherein assertion of said hold signal causes said central processing unit to suspend instruction execution.

8. The pulse width modulation circuit of claim 1 wherein deassertion of said hold signal causes said central processing unit to resume instruction execution.

9. A computer system comprising a circuit for suspending instruction execution for intervals of time, said circuit comprising:

a. a system clock;

b. a programmable register for containing a value;

c. a counter coupled to said system clock, said counter incrementing upon pulses of said system clock;

d. a central processor comprising a first signal line having a first state and a second state, said first state of said first signal line causing said central processor to suspend instruction execution, and said second state of said first signal line causing said central processor to resume instruction execution, said central processor further comprising a second signal line driven by said central processor, said second signal line having a third state and a fourth state, said third state of said second signal line indicating that instruction execution has been suspended by said central processor;

e. a comparator coupled to said counter and said register, said comparator comprising a third signal line which has a fifth state and a sixth state, said comparator setting said third signal line to said fifth state if said counter contains less than or equal to said value contained in said register, said comparator setting said third signal line to said sixth state if said counter contains greater than said value in said register; and e. a first logic circuit coupled to said first signal line, said second signal line and said third signal line, said first logic circuit setting said first signal line to said first state responsive to said fifth state of said third signal line, said first logic circuit subsequently maintaining said first signal line in said first state until said first signal line has said sixth state and said second signal line has said third state, whereupon said first logic circuit will set said first signal line to said second state.

10. The circuit of claim 9 further comprising a programming circuit for setting said value in said programmable register.

11. The circuit of claim 9 further comprising an activation signal line coupled to said counter and said logic circuit, said activation line having a seventh state and an eighth state, said seventh state of said activation signal line causing activation of said counter and said logic circuit, and said eighth state of said activation signal line causing deactivation of said counter and said logic circuit, wherein said first signal line is placed into said second state.

12. The circuit of claim 11 comprising a user-activation circuit coupled to said activation signal line for setting said activation line to said seventh and said eighth states.

13. A pulse width modulation circuit in a computer system for emulating a processor operating at a slower instruction execution speed, the computer system having a system clock, the circuit comprising:

a. a register containing a first value;

b. a counter coupled to the system clock, the counter having a range between a second and third values which includes the first value, the counter incrementing upon a pulse of the clock;

c. a comparator coupled to the counter and the register, the comparator activating a first signal to a first state if the counter contains less than or equal to the value contained in the register, the comparator activating the first signal to a second state if the counter contains greater than the value in the register;

d. a first logic circuit coupled to said comparator and a central processing unit, said first logic circuit activating a second signal to a third state responsive to said first state of said first signal from said comparator, said third state of said second signal causing said central processing unit to suspend instruction execution;

e. a second logic circuit coupled to said first logic circuit and said central processing unit, said second logic circuit activating a third signal to a fifth state upon assertion of a processor suspend acknowledge signal from said central processing unit and receiving said third state of said second signal from said first logic circuit;

f. said first logic circuit maintaining said second signal in said third state until said second logic circuit activates said third signal to said fifth state and said comparator activates said first signal to said second state, thereby causing said first logic circuit to activate said second signal to a fourth state, said fourth state of said second signal causing said central processing unit to resume instruction execution; and g. said second logic circuit activating said third signal to a sixth state upon receiving said second signal in said fourth state from said first logic unit or upon deassertion of said processor suspend acknowledge signal from said central processing unit.

* * * * *